Figure 1:
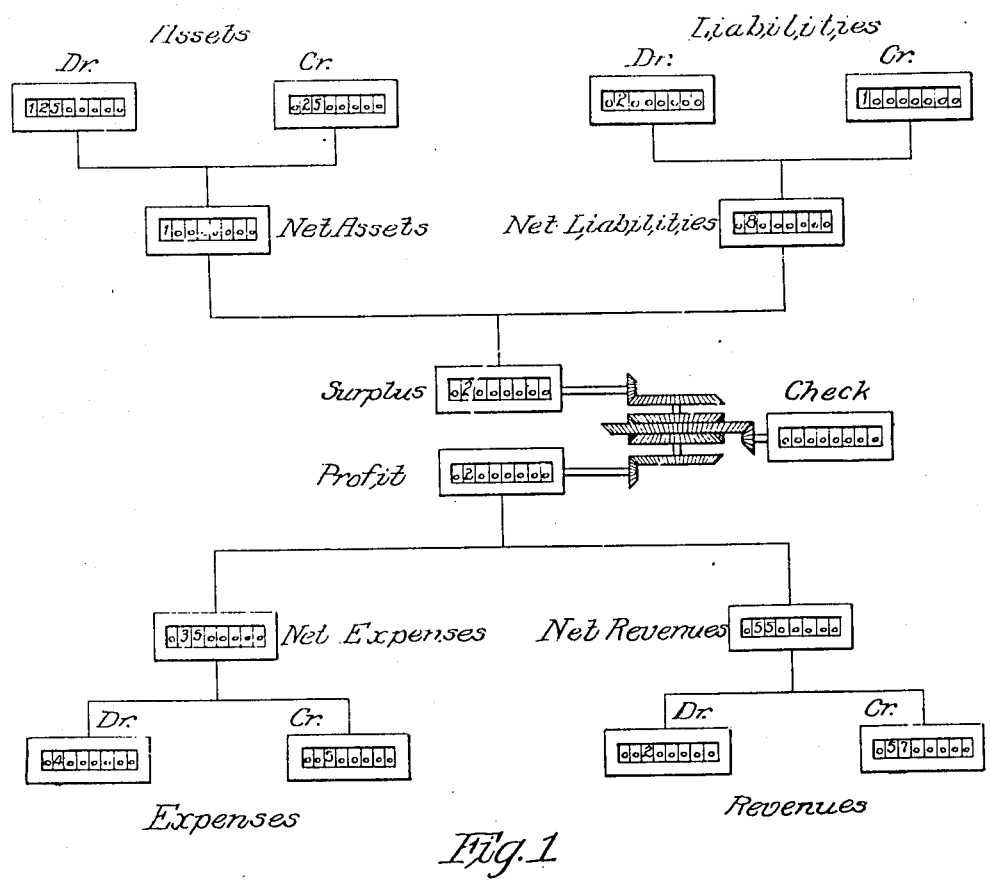

C. H. TALLMADGE.
ACCOUNTING MECHANISM.
APPLICATION FILED JULY 14, 1916.

1,301,795.

Patented Apr. 22, 1919.
3 SHEETS—SHEET 1.

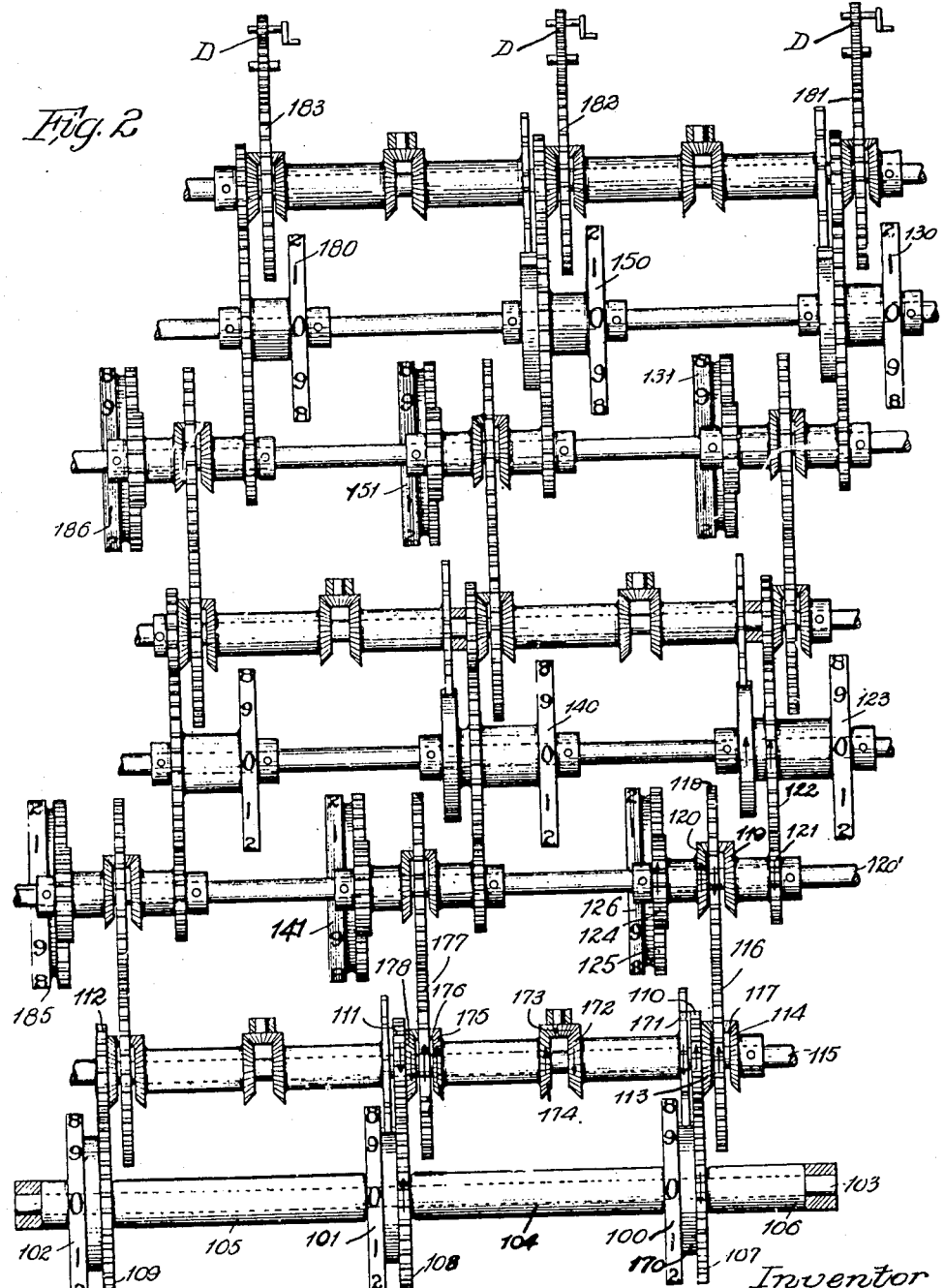

C. H. TALLMADGE.
ACCOUNTING MECHANISM.
APPLICATION FILED JULY 14, 1916.
1,301,795.
Patented Apr. 22, 1919.
3 SHEETS—SHEET 3.
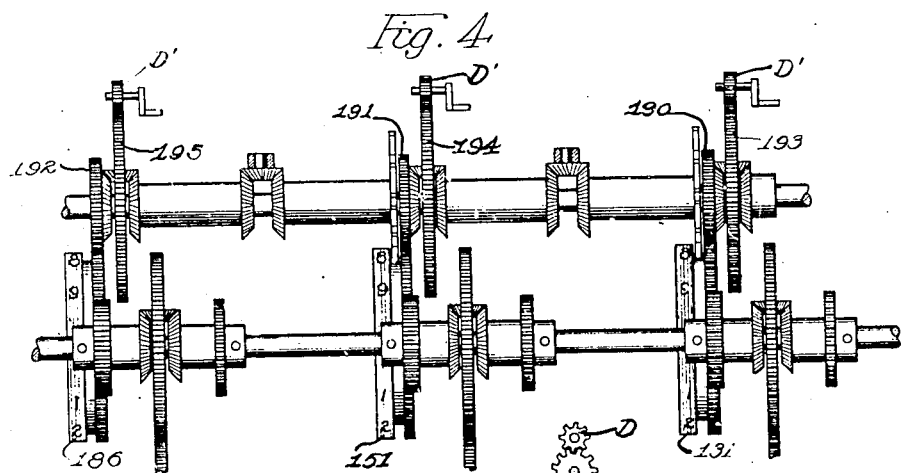
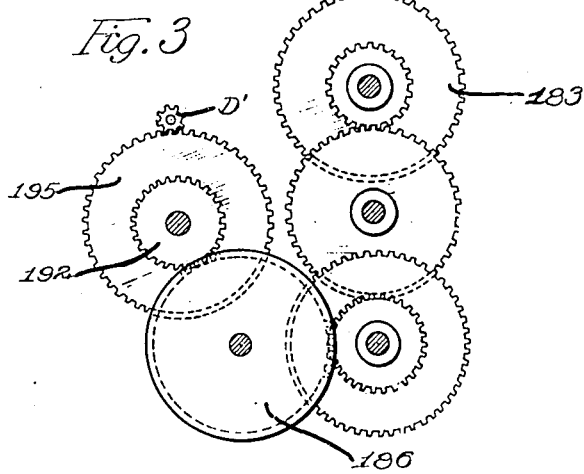

UNITED STATES PATENT OFFICE.

CHARLES H. TALLMADGE, OF BUFFALO, NEW YORK ASSIGNOR TO WILLIAM R. HEATH, OF BUFFALO, NEW YORK.

ACCOUNTING MECHANISM.

1,301,795.   Specification of Letters Patent.   Patented Apr. 22, 1919.

Original application filed October 10, 1913, Serial No. 794,426. Divided and this application filed July 14, 1916. Serial No. 109,222.

*To all whom it may concern:*

Be it known that I, CHARLES H. TALLMADGE, a citizen of the United States, residing at Buffalo, in the county of Erie and State of New York, have invented a certain new and useful Improvement in Accounting Mechanism, of which the following is a full, clear, concise, and exact description, reference being had to the accompanying drawings, forming a part of this specification.

My invention relates to accounting mechanism and one of the principal objects of my invention is to provide a plurality of totalizers so constructed and connected as to accomplish certain desirable results hitherto unknown in the calculating machine and mechanical accounting arts. The mechanism which constitutes the subject matter of this specification and the appended claims finds a large number of uses, one of which is exemplified in my co-pending application, Serial No. 794,426, filed October 10, 1913, of which this specification is divisional However, as I have just intimated the utility of the mechanism presently to be described in detail is not limited to carrying out in part the methods of my earlier application hereinbefore referred to, but may be put to various uses.

The mechanism hereafter described in detail comprises a plurality of totalizers or registers which, for the purpose of explanation I shall describe as adapted to indicate the magnitude of different relatively generic and specific accounts or items in a system of mechanical bookkeeping or accounting. My invention provides means whereby the totalizers which indicate the magnitude of the more generic items or accounts are operated forwardly and backwardly by and in accordance with the operation of the more specific totalizers connected therewith; means whereby digitation may be effected in any of the several orders of the specific totalizers, proper movement being transmitted to the corresponding orders of the more generic totalizers connected therewith; means whereby carrying from order to order in each totalizer is properly effected, and means whereby the driving motion imparted from specific totalizers to their connected common and more generic totalizer or totalizers are offset, one against another, to effect the proper actuation of the more generic totalizer, the indication of which is and should be dependent upon the indications of the specific totalizers which indicate the magnitude of the relatively specific items or accounts which go to make up the more generic items or accounts represented by the so-called generic totalizer.

My invention will be more clearly understood by reference to the accompanying drawings, wherein—

Figure 1 is a diagrammatical representation of the manner in which certain classes of debit and credit items or accounts may be combined to render available certain generic information such as, for instance, net assets and net liabilities, expenses and revenues, and surplus and profit, and Fig. 2 illustrates in detail the manner in which the totalizers are connected together in order to operate in conformity with the diagram of Fig. 1.

Fig. 3 is a more or less diagrammatical end view of the upper part of the structure shown in Fig. 2 and showing in addition thereto means for effecting digitation of the debit liabilities register; and Fig. 4 is a diagrammatical front elevation of the means for effecting digitation of the debit liabilities register, the corresponding means for effecting digitation of the credit liabilities register being broken away for the purpose of better illustration.

In the diagram of Fig. 1 under the caption "Assets" I have shown two totalizers or registers marked respectively "Dr." and "Cr." In practice means is provided for advancing the several numeral wheels of the assets "Dr." and "Cr." totalizers or registers in accordance with the transactions which require operation of these totalizers or registers.

The credits to asset accounts are to be subtracted from the debits to asset accounts to secure the net assets. I have therefore indicated a totalizer marked "Net assets" which is automatically operated to show the difference between the debits and credits to asset accounts. Fig. 2, which will presently be described, illustrates the construction and mode of operation of the mechanism effective to produce this result.

Under the caption "Liabilities" I have shown two totalizers or registers marked "Dr." and "Cr.", these being the totalizers which summate the debits and credits to liabilities accounts. The totalizer marked "Net liabilities" bears the same relation to the liabilities debit and credit totalizers as does the net assets totalizer to the debits and credits to assets totalizers, and is operable to display the difference between the debits and credits to liabilities accounts.

The surplus (or deficit) is the difference between net assets and net liabilities, and in Fig. 1 I have represented a totalizer marked "Surplus" which is operated automatically to display this difference—in other words, to display the surplus.

The lower half of Fig. 1 represents a similar combination of totalizers operating to show the total debits and the total credits to both expense accounts and revenue accounts, and operating also to show net expenses and net revenues, and to show also the difference between net expenses and net revenues, which is the profit (or loss).

Fig. 2 illustrates the mechanism necessary to combine or synthesize the totals shown by the specific or primary totalizers of Fig. 1. It may help in understanding the mechanism of Fig. 2, to point out that the numeral wheels of the totalizer marked "Surplus" in Fig. 1 must tend to advance in conformity with the advancement of the corresponding numeral wheels of the net assets totalizer. The numeral wheels of the net assets totalizer must tend to advance in conformity with the advancement of the corresponding numeral wheels of the totalizer assigned to the totalization of credits to asset accounts, but the numeral wheels of the net assets totalizer must also tend to move backwardly in conformity with the rotation of the corresponding numeral wheels of the totalizer assigned to debits to asset accounts. In like manner, the numeral wheels of the surplus register must tend to move not only forwardly in conformity with the rotation of the numeral wheels of the net assets register, but must tend also to move backwardly in conformity with the rotation of the numeral wheels of the net liabilities register.

In Fig. 2 I have represented the units, tens and hundreds numeral wheels of the surplus register at 100, 101 and 102. These numeral wheels are loosely mounted upon a shaft 103, the several numeral wheels being separated by appropriate spacers 104, 105, 106, etc. Each numeral wheel is formed integrally with a driving spur gear 107, 108, or 109, as the case may be. Each of these driving gears is adapted to be rotated by engagement with a driving pinion 110, 111 or 112, as the case may be. Let us confine our attention for a moment to the driving of the units numeral wheel 100 of the surplus register. This units numeral wheel must be advanced when the units numeral wheel of the net assets register is advanced, providing the units numeral wheel of the net liabilities register is at the moment stationary. It also must be driven backwardly when the units numeral wheel of the net liabilities register is advanced, providing the units numeral wheel of the net assets register is at that time stationary. The driving pinion 110 is, therefore, formed integrally with the bevel gear 113 of a differential gear, the mate 114 of this driving gear 113 being fastened rigidly to the frame, as for example, by means of the fixed journal shaft 115. The common gear 116 is provided with a bevel pinion 117 mounted upon a radial journal mounted in the common gear 116 in the usual manner. When, therefore, the common gear 116 is rotated, the bevel pinion 117 will roll upon the gear 114 to advance the bevel gear 113 and the driving pinion 110, as a result of which the rotation of the gear 116 will cause the rotation of the numeral wheel 100. The driving gear 116 of the differential set is in mesh with a spur gear 118. This gear 118 is a common gear of a differential set similar to that already described, except that the driving gears 119 and 120 are both rotatably mounted upon the journal shaft 120'. The driving gear 119 is formed integrally with a pinion 121, which is in mesh with a gear 122 formed integrally with the units numeral wheel 123 of the net liabilities register. The other driving gear 120 of the differential set, whose common gear is shown at 118, is formed integrally with a spur pinion 124 which is in mesh with a spur gear 125 formed integrally with the units numeral wheel 126 of the net assets register.

I shall now stop to describe the operation of this part of the mechanism. If the units numeral wheel 123 of the net liabilities register is advanced in the direction indicated by the arrow upon the spur gear 122, the spur pinion 121 will be rotated in the reverse direction, as indicated by the arrow upon the periphery of this wheel. Movement will be transmitted through the bevel driving gear 119 to the common gear 118 of the differential set, this common gear being caused to rotate in the direction shown by the arrow upon its periphery. Since this common gear 118 is in mesh with the spur gear 116, the latter will be caused to rotate in the direction of the arrow upon its periphery; and since the bevel gear 114 is fixed in position, the bevel gear 113 and the spur pinion 110 will be rotated in the direction shown by the arrow upon the periphery of the pinion 110. The rotation of the pinion 110 will cause the rotation of the gear 107 in mesh therewith, the latter being rotated in the direction of the arrow upon its periphery. If, therefore, the numeral wheel 123 is turned forwardly one-tenth of a revolution, the numeral wheel 100 will be turned backwardly one-tenth of a revolution. This, however, is on the assumption that the numeral wheel 126 has been meanwhile stationary. Let us now assume that the numeral wheel 123 remains fixed in position while the numeral wheel 126 is advanced one-tenth of a revolution. Such rotation of the gear wheel 125 will cause the pinion 124 to rotate in the direction of the arrow upon its periphery. This pinion will, in turn, cause the bevel gear 120 to rotate in the direction of the arrow upon its periphery. This, in turn, will cause the common gear 118 of the differential set to be rotated in a direction the reverse of that indicated by the arrow upon its periphery. So also, as before, the gears and pinions 116, 110 and 107 will be caused to rotate in directions the reverse of those indicated by the arrows upon their peripheries. This, in turn, will cause the numeral wheel 100 to be turned in the direction the reverse of that indicated by the arrow upon the periphery of the associated gear 107. In other words, one-tenth of a forward revolution of the units numeral wheel 126 of the net assets register will cause a corresponding one-tenth forward rotation of the units numeral wheel 100 of the surplus register.

The units numeral wheel 123 of the net liabilities register is connected through gearing identical with that already described, as a result of which the forward rotation of the units numeral wheel 130 of the liabilities credit register will cause a corresponding forward rotation of the units numeral wheel 123 of the net liabilities register, whereas a forward rotation of the units numeral wheel 131 of the liabilities debit register will cause a corresponding backward rotation of the units wheel 123 of the net liabilities register. The operation of the differential gearing is such that the numeral wheels 130 and 131 may rotate simultaneously or at different times, but in any case the units numeral wheel of the net liabilities register will be moved forwardly or backwardly in conformity with the difference in the degree of rotation of the two numeral wheels 130 and 131. In like manner, the units numeral wheel 100 of the surplus register will be moved forwardly or backwardly in conformity with the difference in the degree of rotation of the two numeral wheels 126 and 123.

Thus far I have described only the driving of the several numeral wheels of units order. The numeral wheels of the tens order are connected through similar gearing to be operated in the same manner. Thus, for example, the tens numeral wheel 101 of the surplus register will be moved forwardly or backwardly in conformity with the difference in degree of rotation of the tens numeral wheel 140 of the net liabilities register and the tens numeral wheel 141 of the net assets register. In like manner, the tens numeral wheel 140 of the net liabilities register will be moved forwardly or backwardly in conformity with the difference in the degree of rotation of the tens numeral wheel 150 of the liabilities credit register and the tens numeral wheel 151 of the liabilities debit register. The hundreds numeral wheels are geared together in the same manner.

Thus far I have not referred to the fact that whenever a numeral wheel of the lower order in any of the totalizers passes from its 9 to its 0 position, it must "carry one" into the numeral wheel of the same totalizer or register of next higher order. I shall now describe the mechanism for effecting these carrying operations:

The units numeral wheel 100 of the surplus register is provided with a male Geneva carrying gear 170, the tooth of which is adapted to mesh in a female Geneva gear 171, the position of the carrying tooth being such that the gear 170 will cause the gear 171 to turn a tenth of a complete revolution whenever the numeral wheel 100 passes from its 9 to its 0 position, or vice versa. The female Geneva gear 171 is formed integrally with a bevel gear 172 which meshes with a bevel pinion 173 whose axis of rotation is fixed in position by a journal connected directly with the frame of the machine. This bevel pinion, in turn, meshes with a bevel gear 174, which is formed integrally with a similar bevel gear 175, the latter, however, being in mesh with the bevel pinion 176 of a differential gear set whose common gear is shown at 177. The bevel pinion 176 is in mesh also with a bevel gear 178, the latter being formed integrally with the driving pinion 111 which meshes with the driving gear 108 of the tens numeral wheel 101.

When, therefore, the units numeral wheel 100 of the surplus register moves from the 9 to the 0 position in a direction the reverse of that indicated by the arrow upon the associated driving gear 107, the female Geneva gear 171 will be caused to rotate in the direction of the arrow shown upon its periphery. The gears 172, 173, 174 and 175 will be caused to rotate in the directions indicated by the arrows placed upon their peripheries. We may assume, in tracing the motion, that the common gear 177 is stationary. The pinion 176 will, therefore, be rotated to transmit motion, driving pinion 111 in the direction of the arrow shown upon its periphery. The movement of this pinion will, in turn, cause the driving gear 108 associated with the tens numeral wheel 101 to be rotated for one-tenth of a revolution in the direction of the arrow shown upon its periphery. When, therefore, the units wheel 100 of the surplus register moves from its 9 to 0 position the tens numeral wheel 101 of the surplus register will be given a forward rotation of one-tenth of a revolution. Conversely, if the units numeral wheel of the surplus register is moved backwardly from its 0 to its 9 position, it will in effect subtract one from the tens order by causing the tens numeral wheel to rotate one-tenth of a revolution in the backward direction.

This motion necessary for the carrying operation will be transmitted and will have its effect upon the tens numeral wheel, even though the common gear 177 is being rotated at the time the carrying motion is being transmitted from the units numeral wheel.

The same sort of carrying mechanism is interposed between the tens numeral wheel and the hundreds numeral wheel of the surplus register, so that each order will carry into or subtract from the next higher order, as is necessary in order that the correct results may be displayed. These carrying operations will take place between any of the orders as may be necessary, regardless of the direct driving of the numeral wheels of the several orders. In other words, the carrying operations and the direct driving operations may take place simultaneously and without conflicting or interfering with one another.

It will be unnecessary to describe the mechanism for carrying between the numeral wheels of the several orders of the other registers, because in each instance the carrying mechanism is substantially identical with that already described.

The numeral wheels 130, 150 and 180 of the liabilities credit register are provided, as shown, with differential driving and carrying mechanism such as that already described, as a result of which the units numeral wheel 130 is driven by means of the units driving gear 181; the tens numeral wheel 150 is driven by the tens driving gear 182, and the hundreds numeral wheel is driven by the hundreds driving gear 183. These driving gears may be regarded as connected with any suitable driving mechanism, one form of which has been diagrammatically illustrated at "D—D" in Fig. 2.

Fig. 2 illustrates the whole of the surplus register, as indicated in Fig. 1. It indicates the whole of the net liabilities register. To save confusion, however, in reading the drawing, I have not shown the numeral wheels 126, 141 and 185 of the net assets register as provided with their carrying and driving mechanism. These numeral wheels are shown in a plane slightly to the rear of that in which the surplus register and net liabilities register are arranged. It will be understood, however, that the net assets register is provided with mechanism for driving it in conformity with the difference between the amounts registered by the assets debit register and the assets credit register, just as the net liabilities register, as shown in Fig. 2, is arranged to be driven in conformity with the difference in the accumulations in the liabilities credit register and the liabilities debit register. I have shown in full the liabilities credit register, comprising numeral wheels 130, 150, 180, etc. The numeral wheels 131, 151 and 186 of the liabilities debit register fall, however, in a plane to the rear of that in which the registers described above are arranged, and to avoid confusion I have, therefore, illustrated the carrying and driving mechanism associated with these numeral wheels of the liabilities debit register in Figs. 3 and 4. The driving and carrying mechanism comprises the driving pinions 190, 191 and 192 connected with the driving gears 193, 194 and 195 respectively, through differential and carrying mechanism identical with that connecting the driving pinions of the credit liabilities register with the driving gears 181, 182, and 183 respectively. The means for actuating the gears 193, 194 and 195 to effect digitation of the credit liabilities register are diagrammatically shown at D'.

It will be apparent from the above description and the showing of Figs. 2, 3 and 4 of the drawings, that the net liabilities register will at all times show the difference between the amounts accumulated in the liabilities credit register and the liabilities debit register, also that the net assets register will show at all times the difference between the accumulations in the assets debit register and the assets credit register, and also that the surplus register will show at all times the difference between the accumulations in the net assets register and the net liabilities register.

It will be apparent that the several registers may be provided with any number of numeral wheels, all connected together and operating in the manner illustrated in Fig. 2 in which, for convenience, I have illustrated registers having only three orders of numeral wheels.

The registers or totalizers assigned to expense debits, expense credits, revenue debits, revenue credits, net expenses, net revenues, and profit (or loss) are geared together in a manner identical with that shown in Fig. 2 and particularly described in connection with the upper half of the diagram of Fig. 1. The classification of accounts in a double-entry system may be and, in fact, should be such that the profit or loss displayed by the profit register will equal the surplus or deficit displayed by the surplus register for any given period of time. It is not uncommon to regard the surplus as accumulating from the commencement of the business, while the profit or loss is frequently accumulated for shorter periods of time, as, for example, one year. In order that the profit shall equal the surplus, it is necessary that both be accumulated from the commencement of the business, or else that both be accumulated for like periods of time, as, for example, one year.

The numeral wheels of the surplus register and the numeral wheels of the profit register may be connected through differential driving mechanism, such as is illustrated in Fig. 2, with the numeral wheels of an equilibrium register such as that marked with the word "Check" in Fig. 1. It will be understood that the equilibrium register normally stands at zero. Should an error or errors occur in operating any of the primary totalizers, viz.: the debits and credits to assets totalizers, the debits and credits to liabilities totalizers, the debits and credits to expenses totalizers, or the debits and credits to revenue totalizers, the equilibrium register will indicate that an error has occurred. While I have illustrated the mechanism which constitutes the subject matter of my present invention as employed for one specific purpose in a system of mechanical accounting, I wish it to be understood that my invention is not so limited.

What I claim as new and desire to secure by Letters Patent of the United States is:

1. In combination three registers one of which is arranged to indicate the difference between the indications of the other two, together with means for effecting digitation in any order of either of the two registers last mentioned and a plurality of differential gear sets, corresponding order sets of all of said registers being connected with different elements of the same differential gear set.

2. In combination three registers each comprising a plurality of order sets, a plurality of differential gear sets and means for connecting corresponding orders of said registers with different elements of the same differential gear set, together with mechanism for effecting digitation in any order of two of said registers.

3. In combination three registers each having a plurality of orders, a plurality of differential gear sets, corresponding orders of all of the registers being connected with different elements of the same differential gear set, means for effecting digitation in any order of two of the registers and differential carrying mechanism for the other register.

4. In an accounting system two primary registers and a generic register, said registers having the same number of orders, as many differential gear sets as said registers have orders, means for connecting corresponding orders of all of the registers with different elements of the same differential gear set, and means for effecting digitation in any order of either of said primary registers.

5. In an accounting system a combination with a generic register and two relatively specific registers and as many differential gear sets as said registers have orders, corresponding orders of all of the registers being connected with different elements of the same differential gear set, whereby movement imparted to corresponding orders of said specific registers is differentially transmitted to the corresponding order of the generic register.

6. In an accounting system the combination with two primary registers and a relatively generic register, as many differential gear sets as the registers have orders, corresponding orders of the three registers being connected with different elements of the same differential gear set, whereby movement imparted to corresponding orders of said specific registers may be differentially transmitted to the corresponding order of the generic register, and differential carrying mechanism between the several orders of the generic register.

7. In combination three registers all having the same number of orders, as many differential gear sets as the registers have orders, corresponding orders of said registers being connected with different elements of the same differential gear set, means for effecting digitation in any order of two of said registers and differential carrying mechanism for the other register.

8. In combination three registers, means for connecting each order of one of the registers with the corresponding orders of the other two, and means for effecting digitation in any order of either of the two registers last mentioned.

9. In combination two specific registers and a third register common to the other two, and means for connecting each order of the common register with the corresponding orders of the other registers whereby digitation in any order of either specific register may be transmitted to the corresponding order of the common register 10. In an accounting system a plurality of registers adapted to indicate the magnitude of different generic and specific accounts or items, the several orders of each register assigned to a specific account or item being connected with a corresponding order of a register assigned to a more generic account or item, and differential carrying mechanism for the registers assigned to more generic accounts or items as aforesaid.

11. In combination three or more registers and a plurality of differential gear sets, corresponding orders of the said registers being connected with different elements of the same differential gear set, and differential carrying mechanism interposed between the several orders of each register.

12. In an accounting system a pair of registers assigned to primary items or accounts, a third register assigned to a more generic item or account, as many differential gear sets as the registers have orders, corresponding orders of the said registers being connected with different elements of the same differential gear set, and differential carrying mechanism for each of said registers whereby digitation may simultaneously occur in any or all of the orders of the primary registers and whereby the generic register is operated to display the difference between the indications of the primary registers.

13. In combination three registers each comprising a plurality of orders, differential carrying mechanism for each of said registers and differential mechanism interposed between the corresponding order sets of said registers whereby digitation may simultaneously occur in any two or all of the orders of two of said registers and whereby the third register is operated to display the difference between the indications of the other two registers.

14. In combination a plurality of registers assigned to primary items or accounts, a register assigned to a more generic item or account, differential carrying mechanism interposed between the several orders of each of said registers and differential mechanism interposed between the several orders of said generic register and the corresponding orders of the primary registers, whereby digitation may occur simultaneously in any two or all orders of the primary registers, and whereby the generic register is operated to display the generic information desired.

15. The combination with a pair of registers of a third register, means for permanently connecting each order of the first register with each of the corresponding orders of the third register, and means for effecting digitation in one of the pair of registers without actuating the other of said pair of registers.

In witness whereof, I hereunto subscribe my name this 4th day of July, A. D. 1916.

CHARLES H. TALLMADGE.

Witnesses:
ARTHUR O. NORTON,
FRED O. JOHNSON.